United States Patent
Saito et al.

(10) Patent No.: US 10,658,120 B2
(45) Date of Patent: May 19, 2020

(54) SOLID ELECTROLYTIC CAPACITOR

(71) Applicant: TOKIN CORPORATION, Sendai-shi, Miyagi (JP)

(72) Inventors: Kazuaki Saito, Sendai (JP); Yuji Yoshida, Sendai (JP); Kenji Araki, Sendai (JP)

(73) Assignee: TOKIN CORPORATION, Sendai-Shi, Miyagi (JP)

( * ) Notice: Subject to any disclaimer, the term of this patent is extended or adjusted under 35 U.S.C. 154(b) by 0 days.

(21) Appl. No.: 15/861,523

(22) Filed: Jan. 3, 2018

(65) Prior Publication Data
US 2018/0211787 A1 Jul. 26, 2018

(30) Foreign Application Priority Data
Jan. 20, 2017 (JP) .................. 2017-008064

(51) Int. Cl.
*H01G 9/15* (2006.01)
*H01G 9/08* (2006.01)
*H01G 9/025* (2006.01)
*H01G 9/10* (2006.01)
*H01G 9/07* (2006.01)
(Continued)

(52) U.S. Cl.
CPC .......... *H01G 9/0003* (2013.01); *H01G 9/012* (2013.01); *H01G 9/042* (2013.01); *H01G 9/0525* (2013.01); *H01G 9/07* (2013.01); *H01G 9/08* (2013.01); *H01G 9/10* (2013.01); *H01G 9/15* (2013.01); *H01G 9/0032* (2013.01); *H01G 9/0036* (2013.01); *H01G 9/052* (2013.01)

(58) Field of Classification Search
CPC .... H01G 9/00; H01G 9/08; H01G 2009/0014; H01G 9/15; H01G 9/07; H01G 9/042; H01G 9/0525; H01G 9/012; H01G 9/025; H01G 9/10; H01G 9/032
USPC .......................... 361/523, 528, 529, 535, 538
See application file for complete search history.

(56) References Cited

U.S. PATENT DOCUMENTS 4,585,700 A * 4/1986 Johnson .................... C08K 3/24
264/310
9,293,263 B2 3/2016 Liu et al.
(Continued)

FOREIGN PATENT DOCUMENTS

JP 59143315 A 8/1984
JP 63022609 B2 5/1988
(Continued)

*Primary Examiner* — Arun Ramaswamy
(74) *Attorney, Agent, or Firm* — Holtz, Holtz & Volek PC

(57) ABSTRACT

In a capacitor element of a solid electrolytic capacitor, a solid electrolytic layer has an edge portion near a root of a lead-out portion. An anode terminal is connected to the lead out portion at a position away from the root of the lead out portion. An ion trapping member includes a first resin and an ion trapping agent dispersed in the first resin. The ion trapping member covers the whole periphery of at least a part of the lead out portion directly or via the dielectric layer between the edge portion of the solid electrolytic layer and the anode terminal. An external insulation member includes a second resin having a high affinity for the first resin. The external insulation member envelops the capacitor element and covers at least a part of the ion trapping member, a part of the anode terminal and a part of a cathode terminal.

9 Claims, 2 Drawing Sheets

(51) Int. Cl.
*H01G 9/042* (2006.01)
*H01G 9/052* (2006.01)
*H01G 9/012* (2006.01)
*H01G 9/00* (2006.01)

(56) References Cited

U.S. PATENT DOCUMENTS

| | | | | |
|---|---|---|---|---|
| 2009/0059479 | A1* | 3/2009 | Yamashita | H01G 9/012 |
| | | | | 361/540 |
| 2010/0110614 | A1* | 5/2010 | Umemoto | H01G 9/028 |
| | | | | 361/525 |
| 2011/0261504 | A1* | 10/2011 | Sugimura | H01G 9/028 |
| | | | | 361/525 |
| 2015/0213961 | A1* | 7/2015 | Liu | H01G 9/012 |
| | | | | 361/529 |

FOREIGN PATENT DOCUMENTS

| | | |
|---|---|---|
| JP | 2007067146 A | 3/2007 |
| JP | 2015142134 A | 8/2015 |

\* cited by examiner

SOLID ELECTROLYTIC CAPACITOR

CROSS REFERENCE TO RELATED APPLICATIONS

This application is based on and claims priority under 35 U.S.C. § 119 to Japanese Patent Application No. JP2017-008064 filed Jan. 20, 2017, the contents of which are incorporated herein in their entirety by reference.

BACKGROUND OF THE INVENTION

This invention relates to a solid electrolytic capacitor.

As a known solid electrolytic capacitor, there is a one disclosed in JPA 2015-142134 (Patent Document 1). The disclosed solid electrolytic capacitor has a capacitor element, an anode terminal, a cathode terminal and an external insulation member. The capacitor element has an anode body covered with a dielectric, an anode lead wire extending from the anode body and a cathode layer. In this solid electrolytic capacitor, the anode lead wire is connected to the anode terminal while the cathode layer is connected to the cathode terminal. Moreover, a part of the anode terminal is covered with a mask layer. Since the part of the anode terminal is covered with the mask layer, elution of metal ions from the anode terminal is prevented or suppressed, suppressing characteristic deterioration caused by migration of the metal ions.

In the solid electrolytic capacitor of Patent Document 1, the mask layer is made of a second resin different from a first resin forming the external insulation member. Therefore, there is a problem that the second resin deteriorates flowability of the first resin upon forming the external insulation member or that sufficient adhesive strength is not achieved between the first resin and the second resin after forming the external insulation member.

SUMMARY OF THE INVENTION

It is an object of the present invention to provide a solid electrolytic capacitor which can suppress characteristic deterioration caused by migration of metal ions and solve the above problems.

One aspect of the present invention provides a solid electrolytic capacitor which comprises a capacitor element, an anode terminal, a cathode terminal, an ion trapping member and an external insulation member. The capacitor element comprises an anode body, an anode lead wire extending outward from inside the anode body, a dielectric layer and a cathode layer including a solid electrolytic layer. The dielectric layer is positioned between the anode body and the solid electrolytic layer. The anode lead wire has a lead out portion protruding outward from the anode body. The lead out portion is covered with the dielectric layer at least in part. The solid electrolytic layer has an edge portion near a root of the lead out portion. The anode terminal is connected to the lead out portion at a position away from the root. The cathode terminal is connected to the cathode layer. The ion trapping member comprises a first resin and an ion trapping agent dispersed in the first resin. The ion trapping member covers a whole periphery of at least a part of the lead out portion directly or via the dielectric layer between the edge portion of the solid electrolytic layer and the anode terminal. The external insulation member comprises a second resin which has a high affinity for the first resin. The external insulating member envelops the capacitor element and covers at least a part of the ion trapping member, a part of the anode terminal and a part of the cathode terminal.

The solid electrolytic capacitor of the present invention is provided with the ion trapping member in which the ion trapping agent is dispersed in the first resin. Accordingly, migration of metal ions can be suppressed, so that characteristic deterioration can be suppressed. Moreover, in the solid electrolytic capacitor, the external insulation member is made of the second resin having the high affinity for the first resin. Accordingly, deterioration of flowability of the second resin can be suppressed upon forming the external insulation member, achieving sufficient adhesive strength between the first resin and the second resin after the forming.

An appreciation of the objectives of the present invention and a more complete understanding of its structure may be had by studying the following description of the preferred embodiment and by referring to the accompanying drawings.

Figure 1:
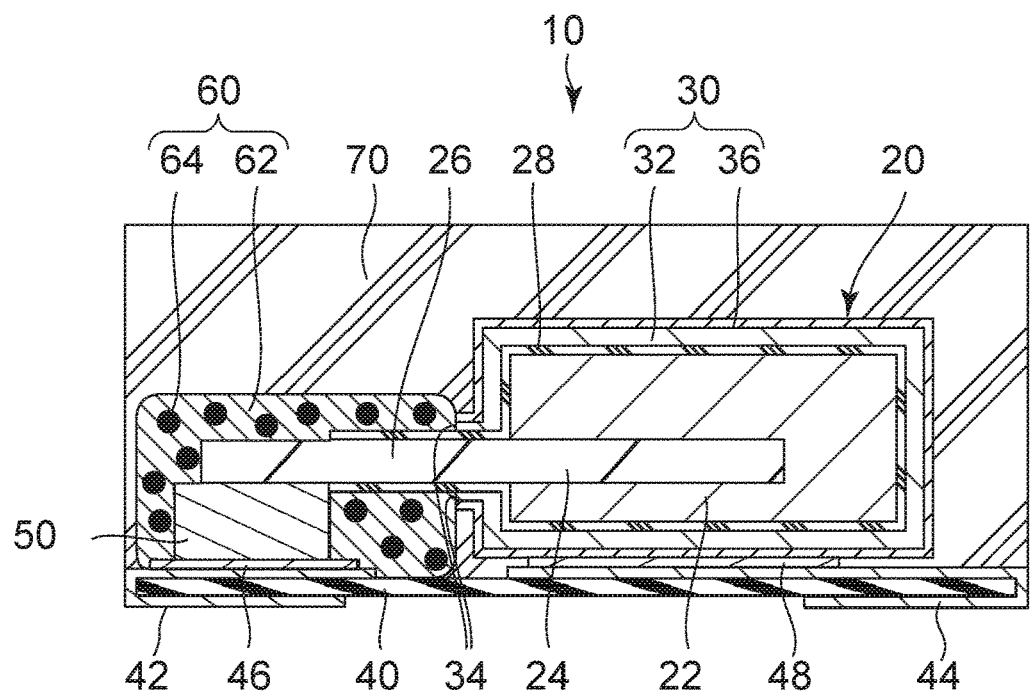
FIG. 1 is a cross-sectional view showing a solid electrolytic capacitor according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIG. 1, a solid electrolytic capacitor 10 according to an embodiment of the present invention is provided with a capacitor element 20, a board 40, an anode terminal 42, a cathode terminal 44, a spacer 50, an ion trapping member 60 and an external insulation member 70. The capacitor element 20 is provided with an anode body 22, an anode lead wire 24, a dielectric layer 28 and a cathode layer 30.

The anode body 22 of the present embodiment is formed of sintered tantalum powders. The anode lead wire 24 is a tantalum wire and embedded in the anode body 22 in part. In other words, the anode lead wire 24 extends outward from inside the anode body 22. The anode lead wire 24 has a lead out portion 26. The lead out portion 26 is a part of the anode lead wire 24 that protrudes outside the anode body 22. The dielectric layer 28 is formed to cover the anode body 22 and a part of the lead out portion 26 of the anode lead wire 24. The anode body 22 and the dielectric layer 28 are formed as follows. First, the anode lead wire 24, which is the tantalum wire, is partly embedded in tantalum powders. Then, the tantalum powders are press molded to obtain a molded body (a porous body). The molded body has a size of 0.5 mm×0.3 mm×0.3 mm. Next, the molded body is sintered. This sintering is carried out at, for example, 1250° C. Thus, the anode body 22 in which the anode lead wire 24 is partly embedded is formed. After that, the anode body 22 with the anode lead wire 24 is soaked in a phosphoric acid aqueous solution to anodize it by impressing a direct voltage of, for example, 20 V. It should be noted that another solution may be used for the anodization. Thus, on the anode body 22 and the lead out portion 26 of the anode lead wire 24, anode oxide film is formed. In a subsequent process, a part of the anode oxide film formed on the lead out portion 26 of the anode lead wire 24 is removed by a laser or the like. As a result, the part of the lead out portion 26 of the anode lead wire 24 is exposed. Thus, the dielectric layer 28, which is made of the anode oxide film, is formed to cover a surface of the anode body 22 and a part of a surface of the lead out portion 26 of the anode lead wire 24.

As shown in FIG. 1, the cathode layer 30 of the present embodiment includes a solid electrolytic layer 32 and a conductive layer 36. The solid electrolytic layer 32 is formed on the dielectric layer 28 while the conductive layer 36 is formed on the solid electrolytic layer 32. However, the present invention is not limited thereto. Provided that the cathode layer 30 includes the solid electrolytic layer 32, it may have another structure. The cathode layer 30 is formed on the dielectric layer 28 to envelop the whole of the anode body 22. In other words, the dielectric layer 28 is located between the anode body 22 and the solid electrolytic layer 32. The cathode layer 30 extends onto the dielectric layer 28 formed on the lead out portion 26 of the anode lead wire 24. However, the cathode layer 30 may not be formed on the dielectric layer 28 formed on the lead out portion 26 of the anode lead wire 24. At any rate, in the present embodiment, an edge portion of the cathode layer 30, in particular, an edge portion 34 of the solid electrolytic layer 32 is positioned near or in the vicinity of a root of the lead out portion 26 of the anode lead wire 24.

The solid electrolytic layer 32 of the present embodiment is made of polyethylenedioxythiophene. In other words, the solid electrolytic layer 32 of the present embodiment is made of a conductive polymer. The solid electrolytic layer 32 is formed by repetition of immersing the anode body 22 on which the dielectric layer 28 is formed in a conductive macromolecule solution and taking out and drying it. The conductive macromolecule solution includes an aqueous solution of ethylenedioxythiophene, an oxidant and a dopant. As the oxidant, various substances including an organic or inorganic iron salt may be used. As the dopant, various substances including a polystyrene sulfonic acid may be used.

The conductive layer 36 of the present embodiment is a laminated body of a carbon layer and a conductive paste layer. However, the present invention is not limited thereto. The conductive layer 36 may have a structure different from the laminated body of the carbon layer and the conductive paste layer. The conductive layer 36 may have a plating layer as a substitute for the conductive paste layer, for example. In the present embodiment, the conductive layer 36 is formed on the solid electrolytic layer 32. The carbon layer is formed by immersing the anode body 22 on which the solid electrolytic layer 32 is formed in a solution including carbon black, a graphite filer and a binder and taking out and drying it. The conductive paste layer is formed by applying a silver paste onto a surface of the carbon layer and drying it.

The spacer 50 of the present embodiment is formed of a metal plate. The spacer 50 is a connection member electrically connecting the lead out portion 26 of the anode lead wire 24 with the anode terminal 42. The spacer 50 is also a support member stabilizing an orientation of the capacitor element 20. For the spacer 50, on the ground of electric conductivity, workability and so on, a metal other than tantalum which is used for the anode lead wire 24, for example, an iron nickel alloy is used. The spacer 50 is connected to the lead out portion 26 of the anode lead wire 24. This connection is carried out after the part of the anode oxide film formed on the anode lead wire 24 is removed by the laser or the like as mentioned above. For the connection, electric welding may be used. In the present embodiment, the spacer 50 is connected to a region, of a side surface of the lead out portion 26 of the anode lead wire 24, from an end to an approximately middle of the lead out portion 26. In other words, the spacer 50 is connected to the lead out portion 26 of the anode lead wire 24 at a position away from both of the root of the lead out portion 26 and the edge portion 34 of the solid electrolytic layer 32.

The board 40 of the present embodiment is made of an insulator. Each of the anode terminal 42 and the cathode terminal 44 of the present embodiment may be a conductive pattern formed on from a front surface to a back surface of the board 40. The capacitor element 20 is mounted on the front surface of the board 40 together with the spacer 50. In detail, the spacer 50 is connected to the anode terminal 42 on a side of the front surface of the board 40. For this connection, high temperature solder 46 is used. The high temperature solder 46 is laser melted to connect the spacer 50 to the anode terminal 42. At the same time, the conductive layer 36 is connected to the cathode terminal 44 on the side of the front surface of the board 40. For this connection, a conductive paste 48 is used. The conductive paste 48 is solidified by baking at 150° C. for 120 minutes. Thus, the anode terminal 42 is connected to the lead out portion 26 of the anode lead wire 24 via the spacer 50 while the cathode terminal 44 is connected to the cathode layer 30. The anode terminal 42 is connected to the lead out portion 26 of the anode lead wire 24 at the position away from the edge portion 34 of the solid electrolytic layer 32 via the spacer 50. It should be noted that another connecting means may be used for each of the connection of the anode terminal 42 and the spacer 50 and the connection of the cathode terminal 44 and the conductive layer 36.

The ion trapping member 60 of the present embodiment is formed of a first resin 62 and an ion trapping agent 64 dispersed in the first resin 62. In the present embodiment, the first resin 62 is an epoxy resin. However, the present invention is not limited thereto, and another resin may be used. It is enough that the first resin 62 has a high affinity for a second resin mentioned later. The ion trapping agent 64 of the present embodiment is a negative ion (anion) trapping agent consisting of a hydrotalcite compound. However, the ion trapping agent 64 may be a positive ion (cation) trapping agent or a both ion (anion and cation) trapping agent. The ion trapping agent 64 is not particularly limited in material. The material of the ion trapping agent 64 may be selected according to its object. The ion trapping member 60 is formed as follows. First, the first resin 62 (the epoxy resin) is kneaded to have a first viscosity. Next, the ion trapping agent 64 is added to the first resin 62, and they are further kneaded to obtain a kneaded formation having a second viscosity. The ratio of the ion trapping agent 64 in the kneaded formation is 1 g to the epoxy resin of 99 g, for example. However, the present invention is not limited thereto. It is enough that the ratio of the ion trapping agent 64 gives a density capable of catching ions effectively or is 1 weight % or more. Each of the first viscosity and the second viscosity can be measured by using a Brookfield type viscometer. Next, application of the kneaded formation of the epoxy resin and the ion trapping agent 64 is carried out to cover the whole periphery of at least a part of the lead out portion 26 of the anode lead wire 24 by using a micro dispenser. After the application, baking is carried out at 160° C. for 90 minutes to harden the epoxy resin and to change the kneaded formation into the ion trapping member 60. In the present embodiment, the ion trapping member 60 envelops almost the whole of the lead out portion 26 of the anode lead wire 24. In detail, the ion trapping member 60 envelops a part of the lead out portion 26 of the anode lead wire 24 that is closer to the end of the lead out portion 26 than the edge portion 34 of the solid electrolytic layer 32. However, if the ion trapping member 60 causes de-doping for the solid electrolytic layer 32, it is necessary to be separated from the edge portion 34 of the solid electrolytic layer 32. In the present embodiment, the ion trapping member 60 further covers the spacer 50 and a part of each of the high temperature solder 46, the anode terminal 42 and the board 40. However, the present invention is not limited thereto. The ion trapping member 60 have only to cover the whole periphery of at least a part of the lead out portion 26 of the anode lead wire 24 directly or via the dielectric layer 28 between the edge portion 34 of the solid electrolytic layer 32 and the anode terminal 42. Here, "between the edge portion 34 of the solid electrolytic layer 32 and the anode terminal 42" means between them in a case where a path is assumed to connect the solid electrolytic layer 32 to the anode terminal 42 along surfaces of the capacitor element 20 and the spacer 50. In other words, the ion trapping member 60 is provided to shut an ion passing path which is possible to be formed along the surfaces of the capacitor element 20 and the spacer 50. However, it is desirable that the ion trapping member 60 covers a portion which can become a metal ion generating source. When the connection member, such as the spacer 50 or the like, is provided to connect the lead out portion 26 with the anode terminal 42 electrically, it is desirable that the ion trapping member 60 covers the connection member and a part of the anode terminal 42.

The external insulation member 70 of the present embodiment is made of the second resin having the high affinity for the first resin 62. The second resin further has a high affinity for the board 40. When the first resin 62 is the epoxy resin, an epoxy resin or a phenol resin is used for the second resin. By the use of the second resin having the high affinity for the first resin, deterioration of flowability of the second resin can be suppressed upon forming the external insulation member 70, and strong adhesive strength is achieved between the external insulation member 70 and the ion trapping member 60. In a case where the ion trapping member 60 is formed to such a wide extent that the whole of the capacitor element 20 is covered or where a ratio of the ion trapping agent 64 contained in the ion trapping member 60 is too much, the flowability of the second resin may, however, remarkably be deteriorated upon forming the external insulation member 70. Accordingly, the application extent of the ion trapping member 60 is limited, at the maximum, to about an extent in which the whole of the lead out portion 26 of the anode lead wire 24 is enveloped. Desirably, the ion trapping member 60 is disposed at an ion generation point in a concentrated manner. The ratio of the ion trapping agent 64 is up to 20 weight %. The application extent of the ion trapping member 60 and the ratio of the ion trapping agent 64 are decided to achieve a necessary flowability of the second resin upon forming the external insulation member 70. In the present embodiment, the external insulation member 70 is formed to envelop the whole of the capacitor element 20. Moreover, in the present embodiment, the external insulation member 70 envelops the spacer 50 and the ion trapping member 60 and covers a part of each of a surface of the board 40, the anode terminal 42 and the cathode terminal 44. However, the external insulation member 70 may be formed to expose a part of the ion trapping member 60 outside.

As mentioned above, in the solid electrolytic capacitor 10 of the present embodiment, the ion trapping member 60 covers the whole periphery of at least a part of the lead out portion 26 of the anode lead wire 24. In a case where a gap is caused between the lead out portion 26 of the anode lead wire 24 and a surrounding resin, i.e. the first resin 62 and the external insulation member 70, by a difference of thermal expansion coefficients of them and where moisture enters into the gap and metal ions are eluted therein from the spacer 50 or the anode terminal 42, the metal ions are caught by the ion trapping agent 64 contained in the ion trapping member 60 before they get to the solid electrolytic layer 32 or the cathode layer 30. Thus, it is suppressed that the metal ions get to the cathode layer 30 to be deposited as a metal by receiving electrons. Furthermore, it is suppressed that the metal ions promote de-doping for the solid electrolytic layer 32. Therefore, a short circuit and a capacitance decrease can be prevented. High temperature and high humidity tests were carried out actually. In each test, a rated voltage was impressed for 160 hours under a condition of a temperature of 85° C. and a relative humidity of 85%. A result of the tests showed a short circuit incidence of 80% about solid electrolytic capacitors (comparative examples 1) each of which did not have the ion trapping member 60. In contrast, the result showed a short circuit incidence of 0% about the solid electrolytic capacitors 10 of the present embodiment. In the solid electrolytic capacitor 10 of the present embodiment, the deterioration of the flowability of the second resin can be suppressed upon forming the external insulation member 70, and strong adhesive strength can be achieved between the external insulation member 70 and the board 40. For instance, in a solid electrolytic capacitor (a comparative example 2) provided with a mask layer or a silicon layer and disclosed in Patent Document 1, an adhesive strength between a board and an external insulation member was equal to 5 N. In contrast, the solid electrolytic capacitor 10 had have an adhesive strength of 15 N between the board 40 and the external insulation member 70.

Figure 2:
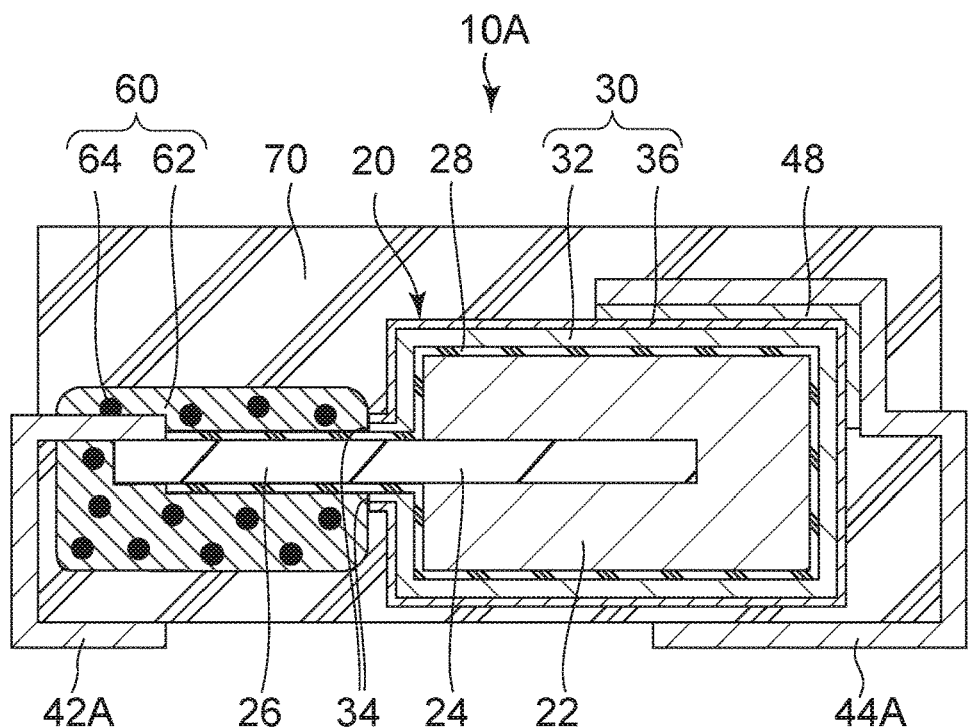
FIG. 2 is a cross-sectional view showing a modified example of the embodiment of the present invention.
Figure 3:
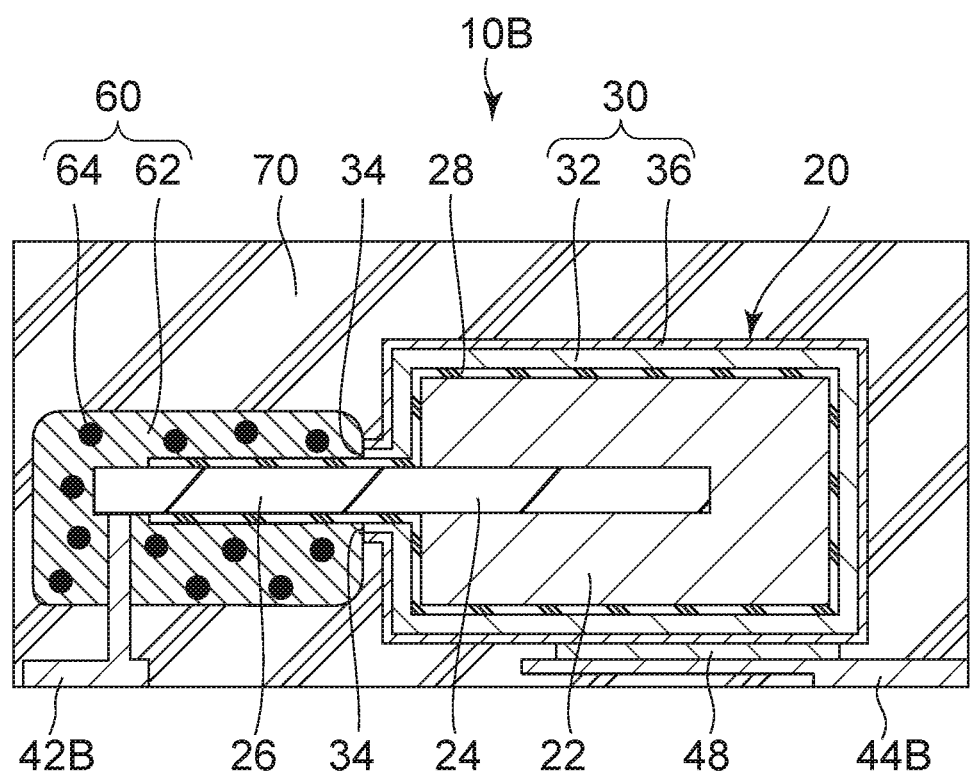
FIG. 3 is a cross-sectional view showing another modified example of the embodiment of the present invention.

Although the specific explanation about the present invention is made above referring to the embodiments, the present invention is not limited thereto but susceptible of various modifications and alternative forms. For example, as a material of the anode body 22 and the anode lead wire 24, a valve action metal, other than tantalum, or its conductive oxide may be used. Although it is preferable that the anode body 22 and the anode lead wire 24 are the same in material, they may be different from each other in material. It may be allowed to use a structure, which does not have the board 40, such as that of a solid electrolytic capacitor 10A shown in FIG. 2 or a solid electrolytic capacitor 10B shown in FIG. 3. In such a case, though particularly not limited, for each of an anode terminal 42A or 42B and a cathode terminal 44A or 44B, it may be allowed to use a member in which a nickel layer and a tin layer are plated in layers on a copper frame.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A solid electrolytic capacitor comprising a capacitor element, an anode terminal, a cathode terminal, an ion trapping member and an external insulation member, wherein:

the capacitor element comprises an anode body, an anode lead wire extending outward from inside the anode body, a dielectric layer and a cathode layer including a solid electrolytic layer;

the dielectric layer is positioned between the anode body and the solid electrolytic layer;

the anode lead wire has a lead out portion protruding outward from the anode body;

the lead out portion is covered with the dielectric layer at least in part;

the solid electrolytic layer has an edge portion near a root of the lead out portion;

the anode terminal is connected to the lead out portion at a position away from the root;

the cathode terminal is connected to the cathode layer;

the ion trapping member comprises a first resin and an ion trapping agent dispersed in the first resin;

the ion trapping member covers a whole periphery of at least a part of the lead out portion directly or via the dielectric layer between the edge portion of the solid electrolytic layer and the anode terminal;

part of the ion trapping member directly contacts the lead out portion;

the external insulation member comprises a second resin which has a high affinity for the first resin; and the external insulating member envelops the capacitor element and covers at least a part of the ion trapping member, a part of the anode terminal and a part of the cathode terminal.

2. The solid electrolytic capacitor as recited in claim 1, wherein the ion trapping member is provided to shut a metal ion passing path which may be formed along a surface of the capacitor element between the edge portion of the solid electrolytic layer and the anode terminal.

3. The solid electrolytic capacitor as recited in claim 1, wherein the ion trapping member envelops a part of the lead out portion that is closer to an end of the lead out portion than the edge portion of the solid electrolytic layer.

4. The solid electrolytic capacitor as recited in claim 1, wherein the ion trapping member has the ion trapping agent in an amount in a range of from 1 weight % to 20 weight %.

5. The solid electrolytic capacitor as recited in claim 1, wherein the ion trapping agent comprises a negative ion trapping agent.

6. The solid electrolytic capacitor as recited in claim 1, wherein the ion trapping agent comprises a positive ion trapping agent.

7. The solid electrolytic capacitor as recited in claim 1, further comprising a connection member which connects the lead out portion with the anode terminal electrically, wherein the ion trapping member covers the connection member.

8. A solid electrolytic capacitor comprising a capacitor element, an anode terminal, a cathode terminal, an ion trapping member and an external insulation member, wherein:

the capacitor element comprises an anode body, an anode lead wire extending outward from inside the anode body, a dielectric layer and a cathode layer including a solid electrolytic layer;

the dielectric layer is positioned between the anode body and the solid electrolytic layer;

the anode lead wire has a lead out portion protruding outward from the anode body;

the lead out portion is covered with the dielectric layer at least in part;

the solid electrolytic layer has an edge portion near a root of the lead out portion;

the anode terminal is connected to the lead out portion at a position away from the root;

the cathode terminal is connected to the cathode layer;

the ion trapping member comprises a first resin and an ion trapping agent dispersed in the first resin;

the ion trapping member covers a whole periphery of at least a part of the lead out portion directly or via the dielectric layer between the edge portion of the solid electrolytic layer and the anode terminal;

the external insulation member comprises a second resin which has a high affinity for the first resin;

the external insulating member envelops the capacitor element and covers at least a part of the ion trapping member, a part of the anode terminal and a part of the cathode terminal; and the ion trapping member has the ion trapping agent in an amount in a range of from 1 weight % to 20 weight %.

9. A solid electrolytic capacitor comprising a capacitor element, an anode terminal, a cathode terminal, an ion trapping member and an external insulation member, wherein:

the capacitor element comprises an anode body, an anode lead wire extending outward from inside the anode body, a dielectric layer and a cathode layer including a solid electrolytic layer;

the dielectric layer is positioned between the anode body and the solid electrolytic layer;

the anode lead wire has a lead out portion protruding outward from the anode body;

the lead out portion is covered with the dielectric layer at least in part;

the solid electrolytic layer has an edge portion near a root of the lead out portion;

the anode terminal is connected to the lead out portion at a position away from the root;

the cathode terminal is connected to the cathode layer;

the ion trapping member comprises a first resin and an ion trapping agent dispersed in the first resin;

the ion trapping member covers a whole periphery of at least a part of the lead out portion directly or via the dielectric layer between the edge portion of the solid electrolytic layer and the anode terminal;

the ion trapping member covers an end of the lead out portion away from the anode body;

the external insulation member comprises a second resin which has a high affinity for the first resin; and the external insulating member envelops the capacitor element and covers at least a part of the ion trapping member, a part of the anode terminal and a part of the cathode terminal.

* * * * *